United States Patent
Sattar et al.

(10) Patent No.: US 9,457,293 B2
(45) Date of Patent: Oct. 4, 2016

(54) PROCESS AND VESSEL FOR REMOVING ONE OR MORE SULFUR COMPOUNDS

(71) Applicants: UOP LLC, Des Plaines, IL (US); Boreskov Institute of Catalysis, Siberian Branch of Russian Academy of Sciences, Novosibirsk (RU)

(72) Inventors: Aziz Sattar, West Chicago, IL (US); Daniel K. Aiken, Arlington Heights, IL (US); Andrey Kuzmin, Novosibirsk (RU)

(73) Assignees: UOP LLC, Des Plaines, IL (US); BORESKOV INSTITUTE OF CATALYSIS, Novosibirsk (RU)

( * ) Notice: Subject to any disclaimer, the term of this patent is extended or adjusted under 35 U.S.C. 154(b) by 725 days.

(21) Appl. No.: 13/709,509

(22) Filed: Dec. 10, 2012

(65) Prior Publication Data
US 2014/0163294 A1   Jun. 12, 2014

(51) Int. Cl.
*B01D 11/04* (2006.01)
*C10G 21/08* (2006.01)

(52) U.S. Cl.
CPC ......... *B01D 11/0446* (2013.01); *C10G 21/08* (2013.01); *C10G 2300/1037* (2013.01); *C10G 2300/202* (2013.01)

(58) Field of Classification Search
CPC .............. B01D 11/0446; C10G 21/08; C10G 2300/202; C10G 2300/1037
See application file for complete search history.

(56) References Cited

U.S. PATENT DOCUMENTS

2014/0163298 A1*  6/2014  Kuzmin ............. B01D 11/0461
585/833

\* cited by examiner

*Primary Examiner* — David A Reifsnyder (57) ABSTRACT

One exemplary embodiment can be a process for removing one or more sulfur compounds from a first liquid. The process can include passing the first liquid through a first inlet and a second liquid through a second inlet, and passing the first liquid through a first outlet and the second liquid through a second outlet of a vessel. The vessel may further have a plurality of vortex contactors. Often, the plurality of vortex contactors has a first vortex contactor, in turn including at least one wall and a frustum. The at least one wall can form a perimeter about an interior space and include a first side and a second side forming a passageway communicating the first liquid from an exterior to the interior space, and a frustum positioned proximate to the passageway and abutting the at least one wall for facilitating contacting of the first and second liquids to extract the one or more sulfur compounds from the first liquid to the second liquid.

10 Claims, 7 Drawing Sheets

PROCESS AND VESSEL FOR REMOVING ONE OR MORE SULFUR COMPOUNDS

FIELD OF THE INVENTION

This invention generally relates to a process and vessel for removing one or more sulfur compounds.

DESCRIPTION OF THE RELATED ART

Current industry practice to extract one or more mercaptan compounds from a hydrocarbon stream can use a water-based caustic solvent. Often, the hydrocarbon stream and the caustic solvent are mixed and then the hydrocarbon and aqueous phases are separated by settling or decanting. The mixing and phase separation operations may be done in a stage wise manner typically involving mechanically or hydraulically-driven intimate mixing of the two phases followed by a settling stage. Generally, the settling stage requires a large vessel volume, such as a large diameter and a tangent length, to allow the dispersed phase to coalesce and separate from the continuous phase under near stagnant conditions. Usually, this large volume minimizes the entrainment or carryover of the dispersed phase in the continuous phase as it exits the settling volume.

Alternatively, a vertically oriented column with multiple stages of contacting trays for liquid-liquid extraction of primarily mercaptan sulfur contaminants from one or more hydrocarbons may use caustic as a solvent in a counter-current flow configuration. Typically, the last tray before the treated hydrocarbon exits the column is followed by a disengaging distance for gravity-aided coalescing/settling of caustic, often followed by wire mesh packing or other coalescing media that can provide the fine coalescing/separation of two immiscible liquids. The packing, in turn, is usually followed by an additional disengaging volume to allow for further separation of caustic from hydrocarbons.

Another approach for separating caustic from hydrocarbon may utilize a non-dispersive contacting device, such as a fiber film contactor, for extraction followed by a horizontal settler that allows for further separation of caustic from hydrocarbon primarily from droplet coalescence and gravity settling.

The use of a mixer-settler device may be amenable to modular supply because the contacting device usually does not require extra ordinary field erection equipment. However, such mixer-settler devices may fail to achieve the required phase mixing and phase separation. Thus, it is desirable to obtain a device that obtains the required phase mixing and separation while minimizing the number and size of vessels to facilitate transportation and installation.

SUMMARY OF THE INVENTION

One exemplary embodiment can be a process for removing one or more sulfur compounds from a first liquid. The process can include passing the first liquid through a first inlet and a second liquid through a second inlet, and passing the first liquid through a first outlet and the second liquid through a second outlet of a vessel. The vessel may further have a plurality of vortex contactors. Often, the plurality of vortex contactors has a first vortex contactor, in turn including at least one wall and a frustum. The at least one wall can form a perimeter about an interior space and include a first side and a second side forming a passageway communicating the first liquid from an exterior to the interior space, and a frustum positioned proximate to the passageway and abutting the at least one wall for facilitating contacting of the first and second liquids to extract the one or more sulfur compounds from the first liquid to the second liquid.

Another exemplary embodiment can be a vessel for removing one or more sulfur compounds. The vessel can include a substantially cylindrical shell having a first end, a second end, a top, and a bottom, and a plurality of vortex contactors positioned within the substantially cylindrical shell. Usually, the plurality of vortex contactors includes a first vortex contactor, in turn having at least one wall and a frustum. The at least one wall can form a perimeter about an interior space and have a first side and a second side forming a passageway communicating at least one of the first and second liquids from an exterior to the interior space, and a frustum positioned proximate to the passageway and abutting the at least one wall for facilitating contacting of the first and second liquids.

A further exemplary embodiment can be a process for counter-current contacting of a first liquid and a second liquid. The process may include passing the first liquid through a first end of a vessel, passing the second liquid through a second end of the vessel, passing the first liquid through a first plurality of vortex contactors, collecting the contacted first liquid, providing the contacted first liquid to the second end of the vessel, and passing the contacted first liquid through a second plurality of vortex contactors. Generally, the first plurality of vortex contactors can include a vortex contactor, in turn having at least one wall forming a perimeter about an interior space and including a first side and a second side forming a passageway communicating the first liquid from an exterior to the interior space for contacting the second liquid. The second plurality of vortex contactors may include another vortex contactor, in turn having at least one wall forming a perimeter about an interior space and including a first side and a second side forming a passageway communicating the first liquid from an exterior to the interior space.

The embodiments disclosed herein can provide a compact device amenable to modular supply by utilizing vortex contacting. One exemplary embodiment is a horizontally oriented vessel housing internals designed to extract one or more sulfur compounds from a hydrocarbon stream by contact with an alkaline, aqueous solvent. The horizontal orientation can facilitate modular equipment supply and minimizing erecting equipment in the field. The embodiments herein can significantly reduce the total overall cost of equipment and facilitate modular supply and installation at site.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the terms "hydrocarbon feed" and "hydrocarbon stream", and "alkaline stream" may also be referred to as, respectively, a "hydrocarbon liquid" and an "alkaline liquid".

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, and preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can mean an amount of generally at least about 80%, preferably about 90%, and optimally about 99%, by mole, of a compound or class of compounds in a stream. If referring to a solute in solution, e.g., one or more thiol compounds in an alkaline solution, the term "substantially" may be referenced to the equilibrium concentration of the solute. As an example, about 8%, by mole, of a solute in a solvent may be considered substantial if the concentration of solute at equilibrium is 10%, by mole.

As used herein, the term "frustum" can mean a solid figure formed when a plane, which is substantially parallel to a base or a top of a cone, a pyramid, and a funnel, sections the shape. With respect to the term "funnical frustum", the sectioning plane can pass through a conical portion of the funnel and be substantially parallel to another plane perpendicular to the mouth of the funnel.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As used herein, the term "mercaptan" means thiol and can include compounds of the formula RSH as well as salts thereof, such as mercaptides of the formula RS-M$^+$ where R is a hydrocarbon group, such as an alkyl or aryl group, that is saturated or unsaturated and optionally substituted, and M is a metal, such as sodium or potassium.

As used herein, the term "disulfides" can include dimethyldisulfide, diethyldisulfide, and ethylmethyldisulfide, and possibly other species having the molecular formula RSSR' where R and R' are each, independently, a hydrocarbon group, such as an alkyl or aryl group, that is saturated or unsaturated and optionally substituted. Typically, a disulfide is generated from the oxidation of a mercaptan-tainted caustic and forms a separate hydrocarbon phase that is not soluble in the aqueous caustic phase. Generally, the term "disulfides" as used herein excludes carbon disulfide ($CS_2$).

As used herein, the weight percent or ppm of sulfur, e.g., "wppm-sulfur" is the amount of sulfur in a hydrocarbon stream, and not the amount of the sulfur-containing species unless otherwise indicated. As an example, methylmercaptan, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound. An exception is that the disulfide content in caustic can be reported as the wppm of the disulfide compound.

As used herein, the term "g-force" can be abbreviated "g" and mean the angular acceleration imparted to a liquid and can be in units of meter per second squared (abbreviated $m/s^2$). One "g" can equal 9.8 $m/s^2$.

As used herein, the terms "intermediate" or "spent" can mean that at least some of the capacity of a second liquid for extracting compounds, such as sulfur compounds, can be at least partially impeded by at least partial saturation by the compounds, or can mean a first liquid being at least partially extracted of the compounds.

As used herein, the term "parts per million" may be abbreviated herein as "ppm" and be based on weight.

As used herein, the term "kilopascal" may be abbreviated "KPa" and all pressures disclosed herein are absolute.

As used herein, the term "immiscible" can describe substances of the same phase or state of matter that cannot be uniformly mixed or blended. As an example, such immiscible mixtures can include liquids such as oil and water, or caustic, such as a water solution of sodium hydroxide, and hydrocarbon.

As used herein, the term "cross-sectional" may refer to a view of only a slice or portion of a component or apparatus without depicting underlying elements.

As depicted, process flow lines in the figures can be referred to interchangeably as, e.g., lines, pipes, liquids, feeds, products, or streams.

DETAILED DESCRIPTION

The embodiments disclosed herein can employ a vortex contactor for mass transferring a solute between two immiscible liquids. Generally, the vortex contactor performs the liquid-liquid extraction and the primary phase separation of the two liquids by using centrifugal force. Additionally, the embodiments can employ a metal mesh, a hydrophobic mesh, a hydrophilic mesh, one or more metal wires, steel wool, one or more vanes, one or more glass fibers, sand, a coalescing media including one or particulates, or any combination thereof to provide fine separation of caustic from hydrocarbon.

Figure 1:
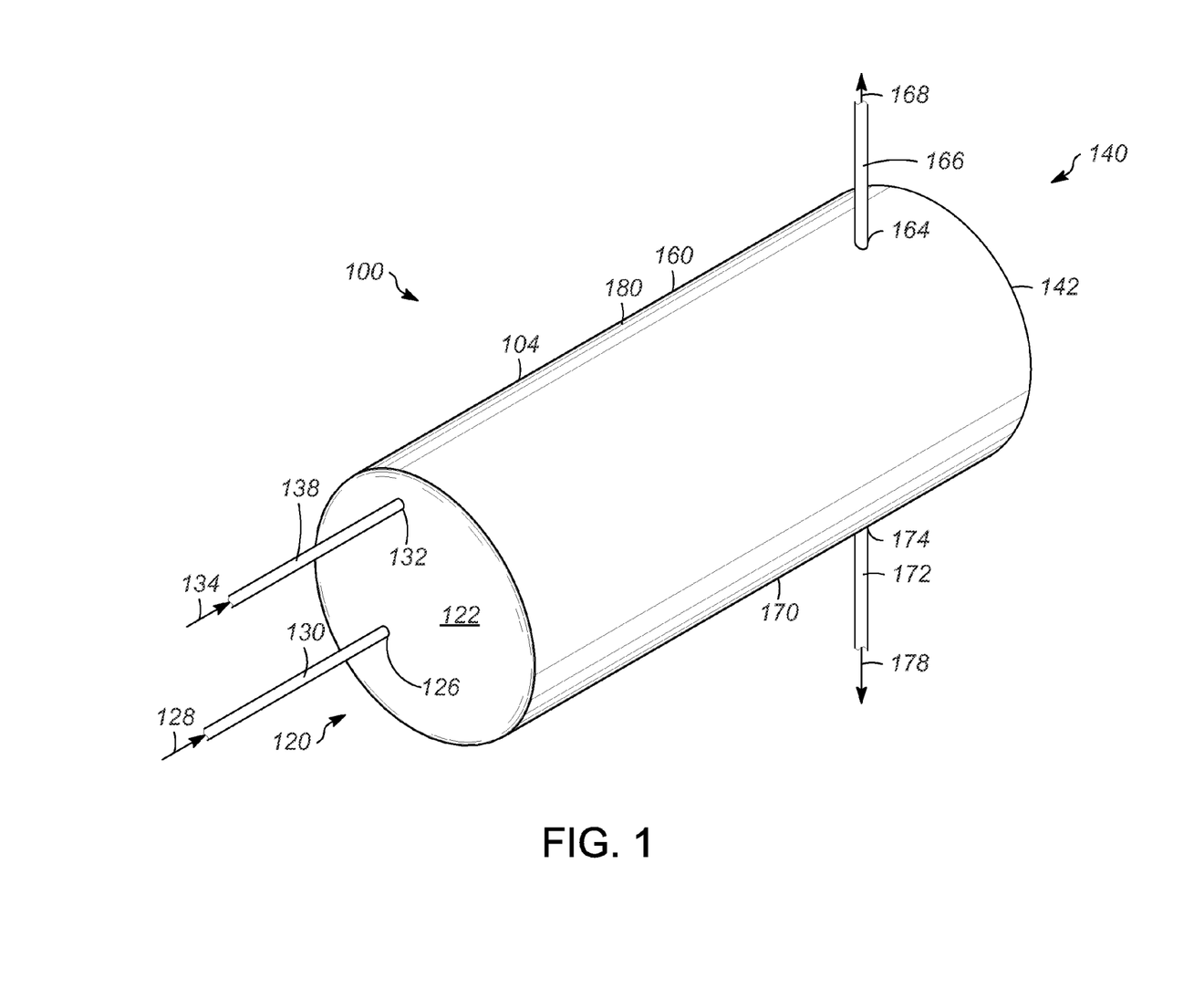
FIG. 1 is a perspective view of an exemplary vessel.
Figure 2:
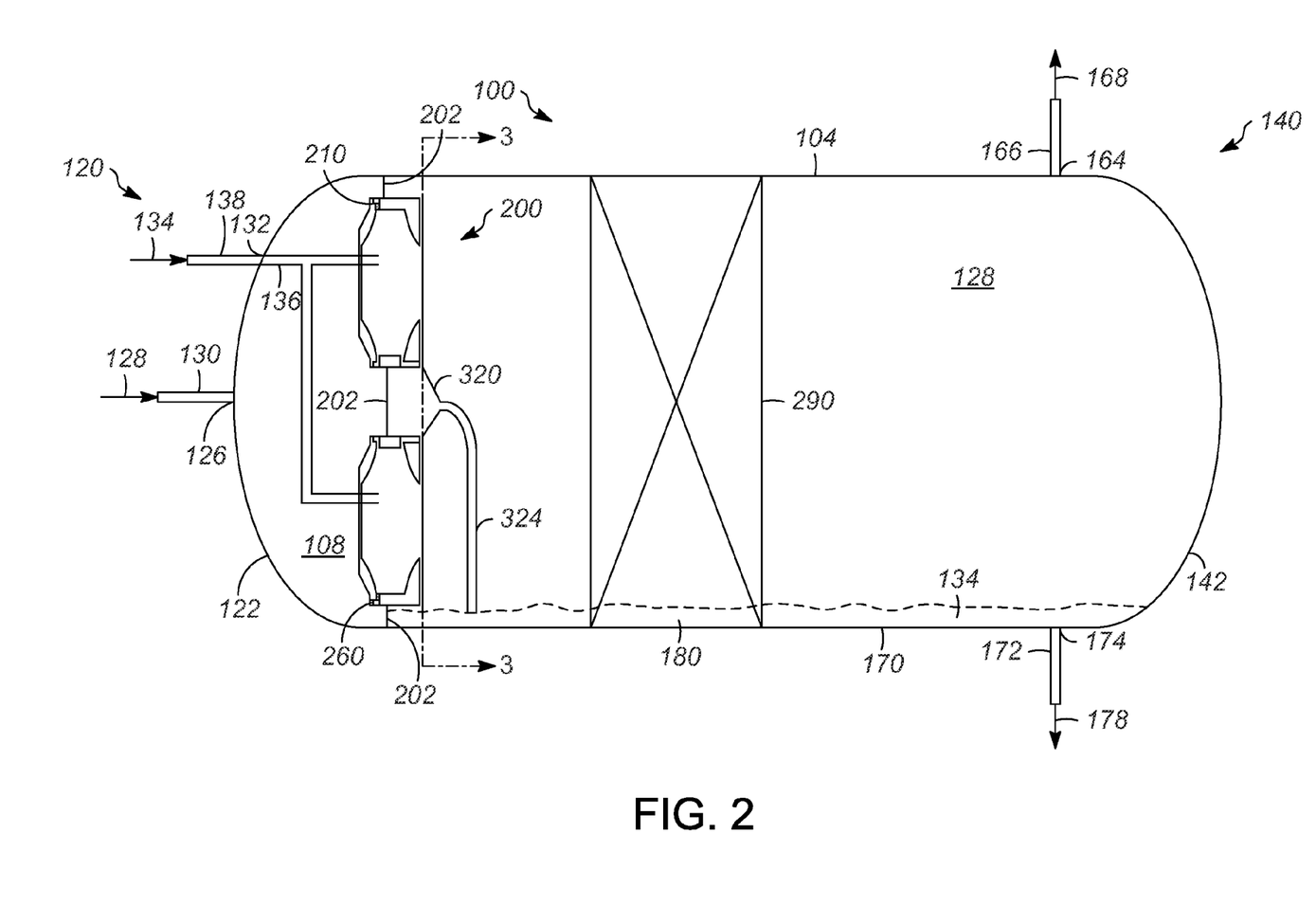
FIG. 2 is an elevational, cross-sectional view of the exemplary vessel.
Figure 3:
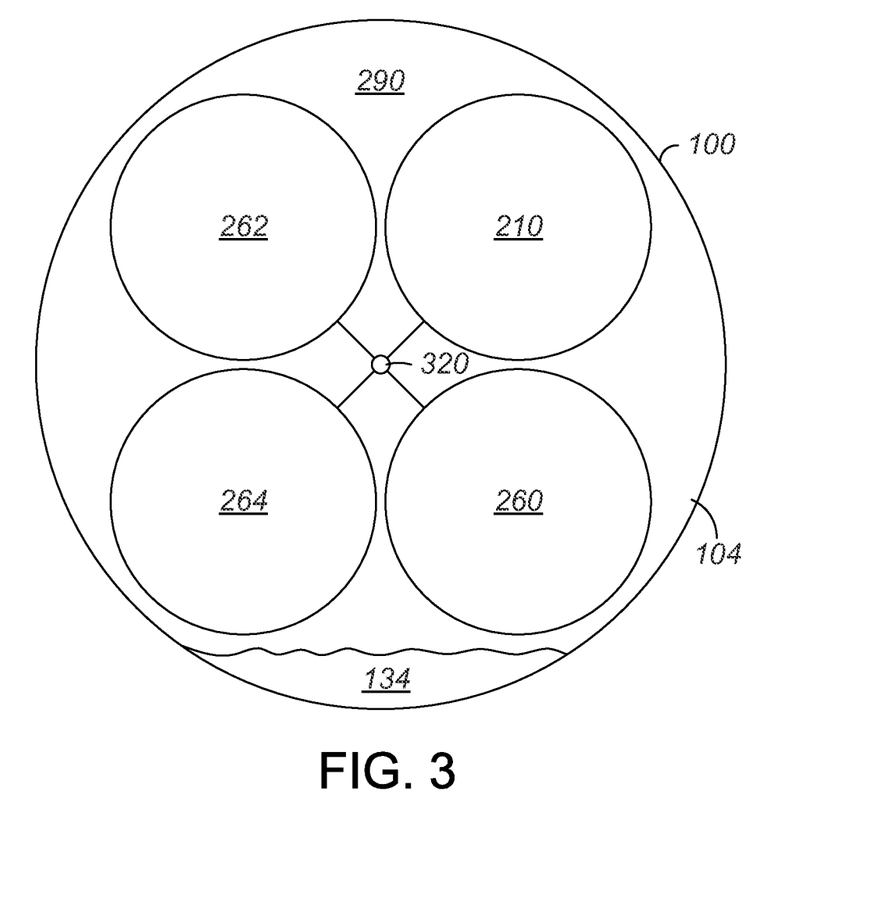
FIG. 3 is a cross-sectional view along lines 3-3 of FIG. 2.

Referring to FIGS. 1-2, an exemplary vessel 100 can include a substantially cylindrical shell 104 having a first end 120, a second end 140, a top 160, and a bottom 170, and orientated substantially horizontally. The substantially cylindrical shell 104 can surround an interior volume 108 with other elements, as described hereinafter, contained therein. Generally, the first end 120 can form a first dome 122 providing a first inlet 126 for a first liquid 128, often a hydrocarbon stream including one or more sulfur compounds, and a second inlet 132 can receive a second liquid 134, often an alkaline liquid or stream. Generally, the first liquid 128 and the second liquid 134 are provided through respective pipes 130 and 138. The second end 140 can form a second dome 142. Generally, the domes 122 and 142 are semi-hemispherical that provide rounded ends to the vessel 100, although the first and second ends 120 and 140 can take other forms, such as flanges. The vessel 100 and other associated equipment can be made from any suitable material, such as carbon steel. Desirably, the contacting of the hydrocarbon liquid and alkaline liquid is co-current, although in other embodiments the contacting may be counter-current.

The vessel 100 as disclosed herein can facilitate the extraction of a component from two immiscible liquids. Although densities may be similar, one liquid is typically heavier than the other. Usually, the first liquid 128 can be lighter and less dense and the second liquid 134 may be heavier and denser. Often, the first liquid 128 can be at least one hydrocarbon, such as a liquefied petroleum gas having one or more C1-C5 hydrocarbons or a naphtha having one or more C5-C12 hydrocarbons; and the second liquid 134 can be an alkaline solution thereof, such as a sodium hydroxide or potassium hydroxide aqueous solution. Generally, the first liquid 128 contains a substance to be extracted and/or reacted, such as one or more sulfur compounds, e.g., one or more thiol compounds. Often, the substance is extracted from the hydrocarbon liquid into an alkaline solution. Examples can include contacting a liquefied petroleum gas containing one or more sulfur compounds and a solution of sodium hydroxide. Such exemplary extraction processes are disclosed in, e.g., U.S. Pat. Nos. 7,326,333 and 8,028,975.

Typically, the first liquid 128 includes up to about 10,000 ppm, preferably no more than about 1,000 ppm, by weight, sulfur in one or more thiol compounds based on the weight of the first liquid 128. Often, the first liquid 128 contains sulfur compounds in the form of one or more thiol compounds and/or hydrogen sulfide as well as carbonyl sulfide, one or more sulfides, and carbon disulfide. Usually, the hydrogen sulfide and the one or more thiol compounds are extracted or removable from the first liquid 128 in the vessel 100. The first liquid 128 may be provided at a first stage at the first end 120.

Generally, the first liquid 128 is combined with the second liquid 134, which can be a caustic, such as an aqueous solution of caustic soda, e.g., sodium hydroxide or potassium hydroxide The aqueous solution can include about 1-about 30%, by weight, of the alkaline material, e.g., caustic. Such alkaline aqueous solutions are disclosed in, e.g., U.S. Pat. No. 7,326,333. In co-current processing, the second liquid 134 can be provided to the first stage, namely the first end 120 of the vessel 100.

The top 160 can provide a first outlet 164 communicating with a pipe 166 for a hydrocarbon product 168, and the bottom 170 can provide a second outlet 174 communicating with a pipe 172 for an alkaline liquid 178. The vessel 100 can form a middle 180 approximately in the center of the cylindrical portion of the shell 104.

The vessel 100 and the shell 104 can contain an inlet manifold 136, a plurality of vortex contactors 200, a coalescer 290, and an outlet collector manifold 320. Alternatively, each vortex contactor 200 may have a separate conduit to convey liquid instead of the outlet collector manifold 320. The plurality of vortex contactors 200 can be coupled to the shell 104 and each other by supports 202. The coalescer 290 can include a metal mesh, which may be coated, one or more metal wires, steel wool, one or more vanes, one or more glass fibers, sand, a coalescing media including one or particulates, or any combination. The coalescer 290 may provide additional, finer separation between the two immiscible liquids, although the bulk of the separation may occur upstream. Generally, the inlet manifold 136 can communicate with the second inlet 132 to provide the second liquid 134 to the plurality of vortex contactors 200. The first inlet 126 can provide the hydrocarbon first liquid 128 into an interior volume 108 at the first end 120.

Referring to FIGS. 2-5, the plurality of vortex contactors 200 can include four vortex contactors, namely a first vortex contactor 210, a second vortex contactor 260, a third vortex contactor 262, and a fourth vortex contactor 264, although any suitable number of vortex contactors may be used. Moreover, each vortex contactor can be substantially similar to the others. As a consequence, only the first vortex contactor 210 will be described in further detail herein. The vortex contactors can be substantially similar, and examples of vortex contactors are disclosed in, e.g., U.S. application Ser. Nos. 13/709,329 and 13/709,376, both by Kuzmin et al., filed herewith, which are hereby incorporated by reference in their entirety.

The first vortex contactor 210 can include at least one wall 214, often being substantially cylindrical and formed about a center 212, creating a perimeter 218 about an interior space or vortex zone 222. The at least one wall 214 can form a plurality of passageways 236, such as a passageway 238, for facilitating the transport of liquid therethrough. Particularly, the at least one wall 214 may form a conduit for the first liquid 128 to travel through the vortex contactor 210 to a swirler 240. This portion of the at least one wall 214, which can be substantially ring shaped, can be considered the swirler 240 in some exemplary embodiments. Generally, the swirler 240 can be a separate component formed integrally with the at least one wall 214, be formed by the at least one wall 214, or be provided as a separate component coupled to the at least one wall 214.

Figure 4:
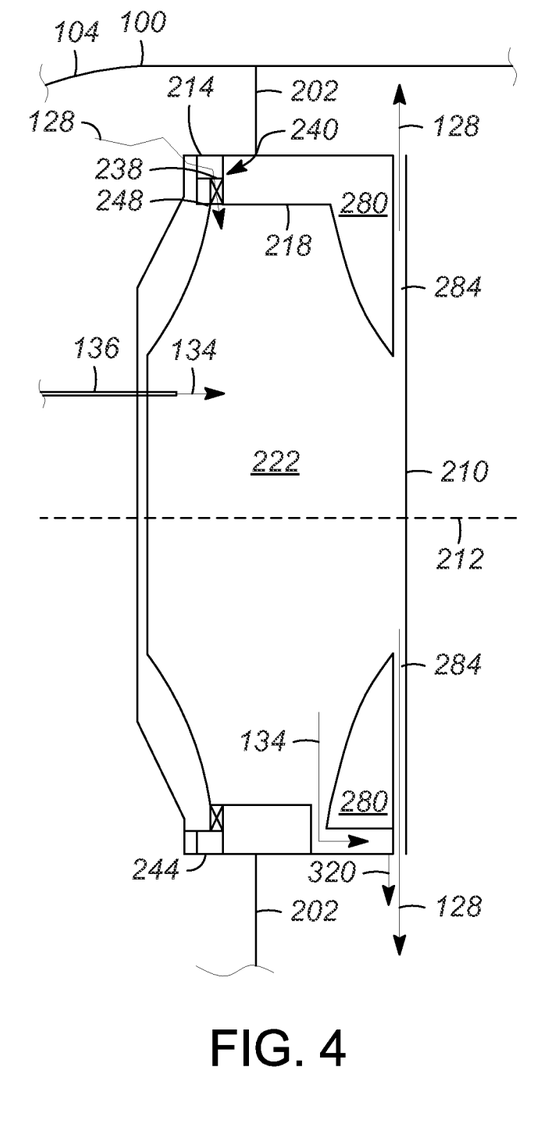
FIG. 4 is an enlarged, cross-sectional view of an exemplary vortex contactor.
Figure 5:
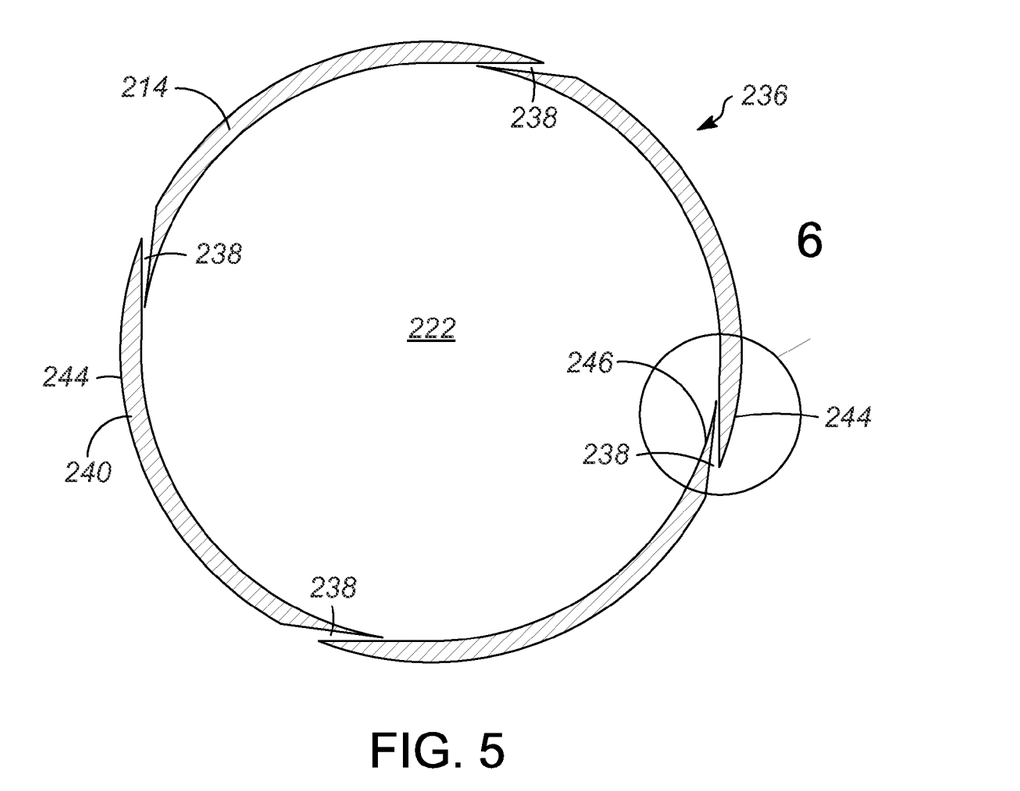
FIG. 5 is a cross-sectional view of a slice of an exemplary swirler.
Figure 6:
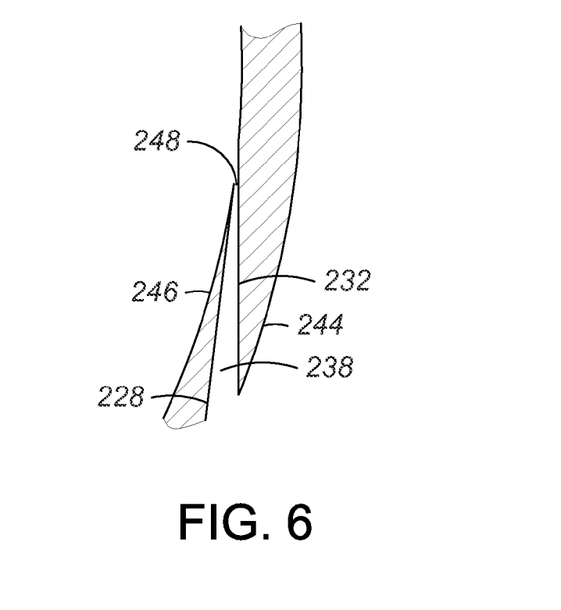
FIG. 6 is an enlarged view of a portion of the slice of the exemplary swirler of FIG. 5.

Referring to FIGS. 4-6, the swirler 240 can be formed proximate to the perimeter 218 of the interior space 222 and reside upstream of the frustum 280. Generally, the at least one wall 214 can form a circular channel about an exterior or a periphery 244 of the swirler 240 to allow the first liquid 128 to flow into each passageway 238. In this exemplary embodiment of FIG. 5, four exemplary passageways 238 are depicted, but any suitable number of passageways 238 may be formed in the swirler 240.

Often, the swirler 240 can impart a rotational motion to the first liquid 128 passing from the exterior or periphery 244 to the inner surface 246 of the swirler 240 to form a vortex. The swirler 240 can communicate at high pressure the first liquid 128 to the vortex zone 222 at an angular acceleration of about 1-about 200 g, preferably about 1-about 60, and more preferably about 10-about 60 g. The g-force can vary depending on the location, and may be lower in the vortex zone 222. Usually, the swirler 240 can form a plurality 236 of passageways 238 where each passageway 238 can taper from the periphery 244 to the inner surface 246.

Each passageway 238 can be defined by a first side 228 spaced apart from a second side 232 that tapers each passageway 238 to form a slot 248. Thus, a swirl can be imparted from the first liquid 128 passing into each passageway 238 and exiting a respective slot 248 formed in the inner surface 246 of the swirler 240.

Alternatively, the first side 228 can form vanes at an angle of about 90-about 180° with respect to one another that can further taper the passageway 238. As an aside, each side 228 and 232 can, independently, be considered a vane. The tapering of the passageway 238 can facilitate accelerating and imparting a circular motion to the first liquid 128. The sides 228 and 232 can be formed integrally with the swirler 240, or formed as separate components and coupled together to at least partially include the swirler 240.

The first vortex contactor 210 can also include a frustum 280, preferably funnical, positioned below the passageway or downstream of the passageway 238 and abutting the at least one wall 214 for facilitating the contacting of the first and second liquids. Although not wanting to be bound by theory, the rotational movement of the liquids can be accelerated by means of a curved internal structure that may enable the heavier phase to move rapidly toward the vortex contactor walls. Moreover, the frustum can maintain the stability of the vortex and minimize fluctuation of pressure and flow. The curved internal structure may include the funnical frustum 280, preferably parabolic, that may abut the internal wall and taper the inner radius of the at least one wall 214.

The funnical frustum 280 can be positioned proximate and downstream to the swirler 240 and abut the at least one wall 214. It should be understood that the at least one wall 214 and the funnical frustum 280 can be formed as separate pieces and coupled together, or formed integrally together. The funnical frustum 280 can form a curvature for facilitating the formation of a vortex. At least a portion of its curvature can resemble a parabola. Although a parabolic profile is depicted other suitable profiles can include a rectangular, a conical, or a concave profile. Generally, the cross-section of the funnical frustum 280 can resemble any suitable bell curve.

Generally, the first liquid 128 can be provided to the passageway 238, which may be communicated to the vortex zone 222. The second liquid 134 can be provided from the inlet manifold 136 to the vortex zone 222 of the first vortex contactor 210. The inlet manifold 136 can terminate as an open pipe or in any suitable flow distribution device, such as a spray nozzle or a distribution ring. The first liquid 128 exiting the passageway can be at a sufficient force, such as about 1-about 200 g, from the passageway 238 to impart a rotational motion to result in the second liquid 134 becoming dispersed within the first liquid 128. The second liquid 134, being denser, can recede to the perimeter 218 of the first vortex contactor 210 due to the centrifugal force and exit via an outlet collector manifold 320. The contacting of the first and second liquids 128 and 134 can extract one or more sulfur compounds from the first liquid 128 into the second liquid 134. The lighter first liquid 128 can be directed by the funnical frustum 280 to the center 222 of the first vortex contactor 210 and exit via a passageway 284 downstream of the funnical frustum 280.

As shown in FIG. 2, the first liquid 128 can then enter the interior volume 108 while the second liquid 134 can be directed by the outlet manifold 320 via a pipe 324 to the bottom 170 of the shell 104. Generally, the first liquid 128 being lighter and less dense can pass through the coalescer 290 that can coalesce any fine droplets of the second liquid 134 into larger droplets and fall to the bottom 170 of the shell 104. What is more, the first liquid 128 and the second liquid 134 could begin to separate upstream of the coalescer 290. However, upon contacting the coalescer 290, droplets of the second liquid dispersed within the first liquid 128 can coalesce into larger droplets, and fall to the bottom 170 of the vessel 100. The coalescer 290 can be positioned near the middle 180 of the vessel 100.

Downstream of the coalescer 290, the shell 104 can contain the first liquid 128 forming a first hydrocarbon phase and the second liquid 134 forming a second alkaline phase. Generally, the second phase passes through the second outlet 174 as an alkaline liquid 178 via the pipe 172. The first liquid 128 can exit the first outlet 164 via the pipe 166 as a hydrocarbon product 168 that generally includes about 1-about 10 ppm, preferably no more than about 1 ppm, by weight, of, independently, a cation such as sodium associated with the alkaline liquid, and one or more sulfur compounds. However, it should be understood that several vessels 100 can be used in series so the hydrocarbon effluent exiting the last vessel can ensure that no more than about 1 ppm, by weight, of, independently, the cation and one or more sulfur compounds can be present in the hydrocarbon product 168.

Figure 7:
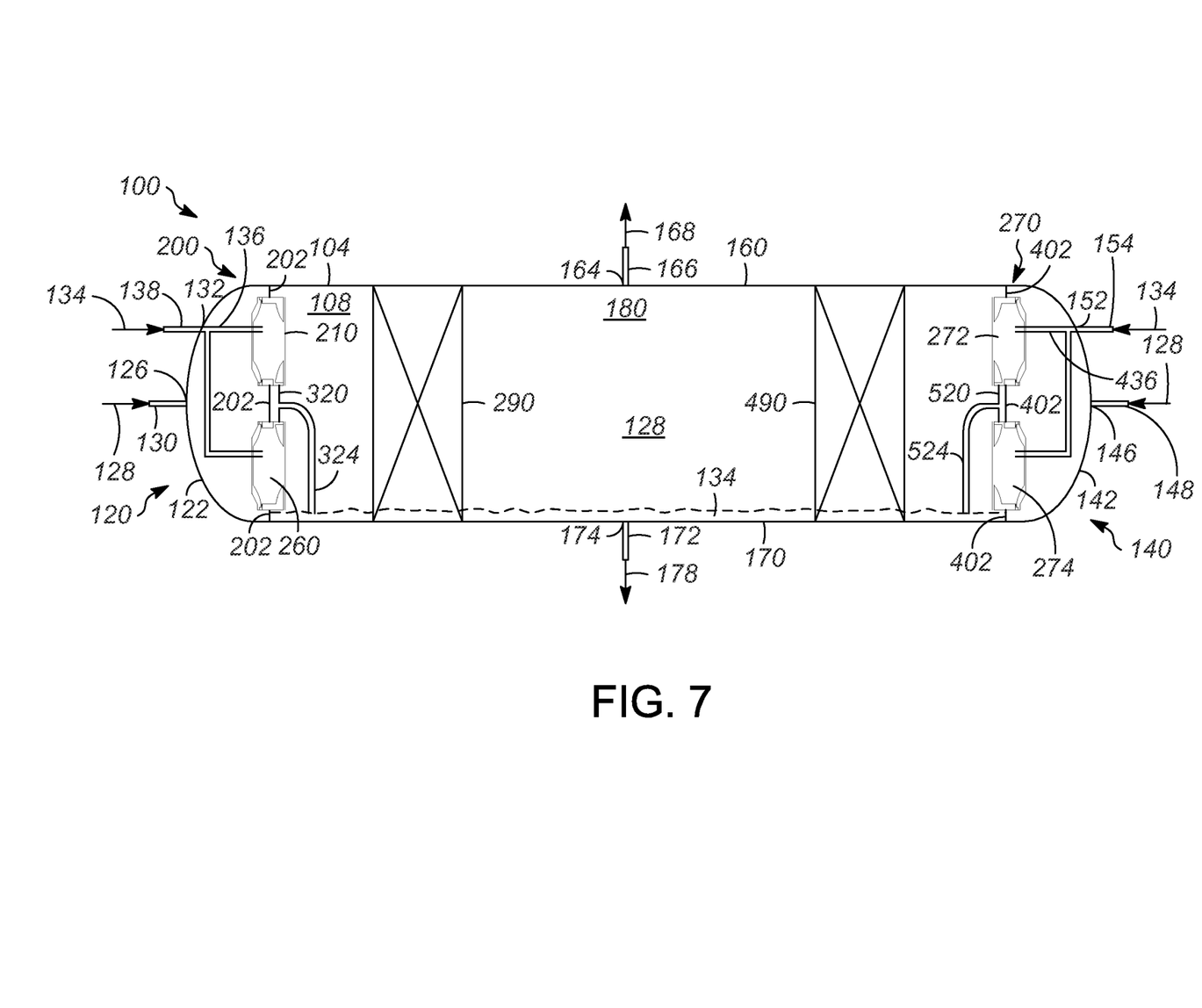
FIG. 7 is an elevational, cross-sectional view of another exemplary vessel.

Referring to FIG. 7, another version of the vessel 100 is depicted. Elements of the vessel 100 in FIG. 7 with the same elements as in FIG. 1 may have the same respective reference numerals as in FIG. 1, even if the elements are depicted with different shapes. The vessel 100 can include a second inlet manifold 436, a second plurality of vortex contactors 270, a second outlet collector manifold 520, a pipe 524, and a second coalescer 490, which can have structures at the opposing second end 140 mirroring structures at the first end 120. The second plurality of vortex contactors 270 can include four vortex contactors, although only a fifth vortex contactor 272 and a sixth vortex contactor 274 are depicted in FIG. 7. The plurality of vortex contactors 270 can be substantially similar as the plurality of vortex contactors 200, as discussed above. Moreover, the plurality of vortex contactors 270 can be coupled to the shell 104 and each other by supports 402. Additionally, the vessel 100 can include a third inlet 146 and a fourth inlet 152 positioned at the second end 140. Generally, the first liquid 128 can be provided by a pipe 148 from the third inlet 146, and the second liquid 134 can be provided by a pipe 154 from the fourth inlet 152.

The first liquid 128 can be provided to the interior volume 108 within the shell 104 at the second end 140 while the second liquid 134 can be provided via the fourth inlet 152 to a second inlet manifold 436. Generally, the second outlet collector manifold 520 communicates the second liquid 134 via a pipe 524 to the bottom 170 of the vessel 100. During contacting, one or more sulfur compounds can be extracted from the first liquid 128 into the second liquid 134. Thus, the first liquid 128 downstream of the coalescers 290 and 490 can collect in the middle 180 of the vessel 100. This downstream first liquid 128 can separate into a first or lighter phase often containing the hydrocarbon liquid while the heavier or second liquid 134 may form a second phase and collect near the bottom 170 of the vessel 100. The first liquid 128 may exit the first outlet 164 at the top 160 of the vessel 100 as a hydrocarbon product, having the amount of cation and sulfur present as described above, while the denser second liquid 134 can exit the second outlet 174 as a spent alkaline liquid 178. Both the first outlet 164 and the second outlet 174 can be proximate to the middle 180 of the vessel 100.

Figure 8:
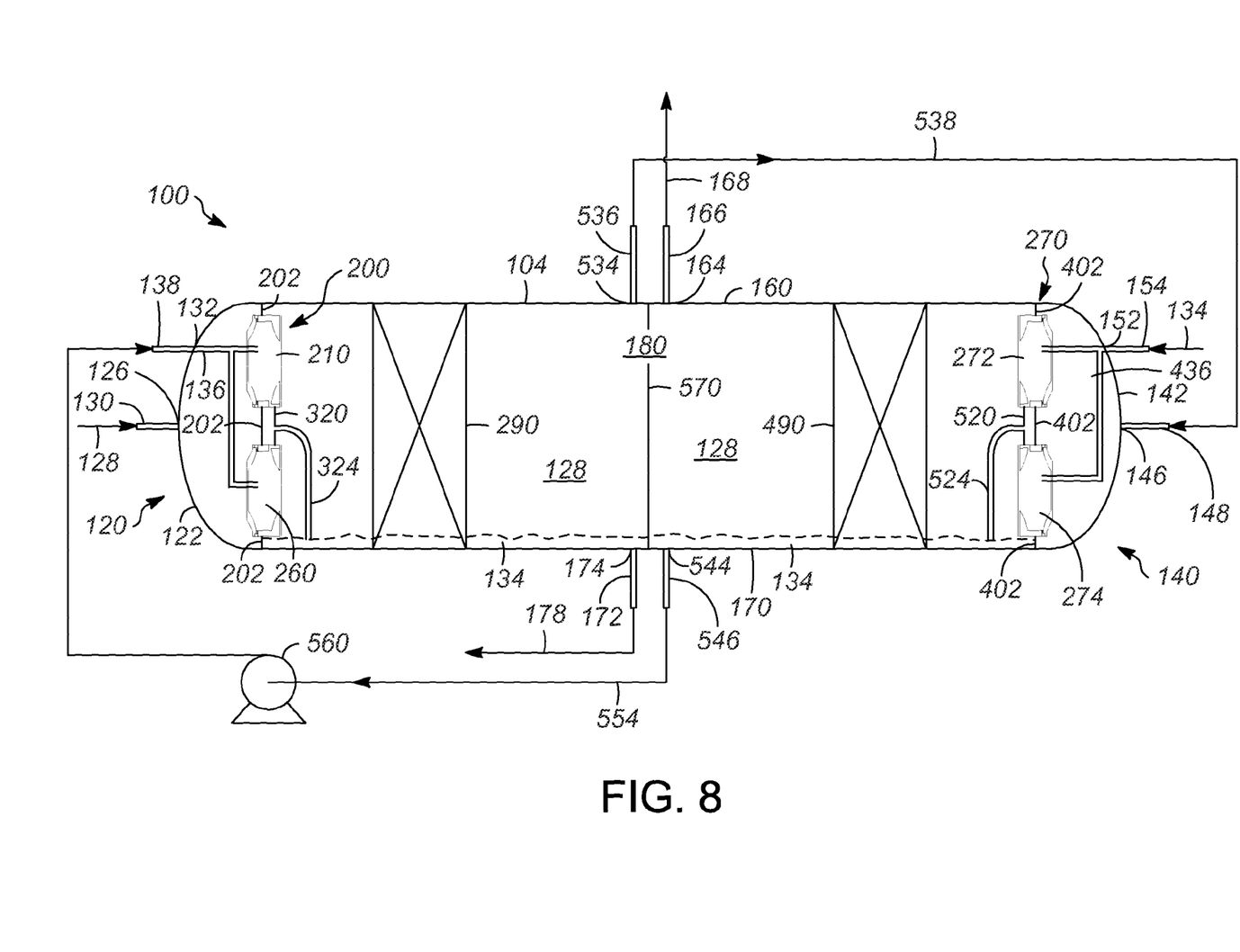
FIG. 8 is an elevational, cross-sectional view of yet another exemplary vessel.

Referring to FIG. 8, another version of the exemplary vessel 100 is depicted. Elements of the vessel 100 in FIG. 7 with the same elements as in FIG. 1 may have the same respective reference numerals as in FIG. 1, even if the elements are depicted with different shapes.

In this exemplary embodiment, the shell 104 can contain and be configured substantially the same as the vessel 100 depicted in FIG. 7. However, a partition or wall 570 is provided to fluidly separate the first end 120 from the second end 140 to provide counter-current contacting of hydrocarbons and alkaline. In addition, additional outlets are provided, namely a third outlet 534 and a fourth outlet 544 communicating with respective pipes 536 and 546.

Generally, a sulfur-rich liquid 128, such as a hydrocarbon, e.g., liquefied petroleum gas, enters the first inlet 126 and passes through the plurality of vortex contactors 210 and the coalescer 290 to exit third outlet 534 as an intermediate first liquid 538. This intermediate first liquid 538 can be provided to the third inlet 146 at the second end 140. Meanwhile, the second liquid 134, such as a lean alkaline stream, is provided to the fourth inlet 152 at the second end 140. Often, as the second liquid 134 passes through the second plurality of vortex contactors 270, similarly as described above, and through the pipe 524 to the bottom 170 of the shell 104, to form a partially spent liquid 134 as a second phase and a lighter first liquid 128 as first phase. This alkaline liquid can exit the fourth outlet 544 as an intermediate second liquid 554 and be provided to a pump 560. The pump 560 can transfer the intermediate second liquid 554 to the second inlet 132 to pass through the plurality of vortex contactors 210 via the pipe 324. The alkaline liquid 134 can collect in the bottom 170 of the shell 104 as an alkaline phase 134. This alkaline second liquid 134 at least partially or fully saturated with one or more sulfur compounds can then exit the second outlet 174 as a sulfur-rich alkaline liquid 178.

Returning to the second end 140 with the intermediate first liquid 538 provided to the third inlet 146, this intermediate first liquid 538 can pass through the plurality of vortex contactors 270 and through the coalescer 490. After passing through the coalescer 490, the intermediate first liquid 538 may further separate as a lighter, hydrocarbon phase and exit the first outlet 164 as a hydrocarbon product 168, which can include, independently, about 1-about 10 ppm, preferably no more than about 1 ppm, by weight, of the cation and one or more sulfur compounds, as described above.

Generally, the vessel 100 has a suitable length to allow the coalescing of the second liquid 134 that was dispersed by the plurality of vortex contactors 200 into the first liquid 128 and the sulfur compounds in the first liquid can be transferred to the second liquid 134 during this contacting in the plurality of vortex contactors 200 and then subsequent separation in the shell 104. The versions of the vessel 100 disclosed herein can provide one or two stages of contacting. Particularly, with respect to the vessel 100 disclosed in FIG. 8, it can provide two stages of counter-current contacting, while the versions of the vessel depicted in FIGS. 1 and 7 may provide a single contacting stage. Although one or two stages are disclosed, it should be understood that more than two stages may be utilized, such as arranging several vessels in series.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for removing one or more sulfur compounds from a first liquid comprising a contaminant said process comprising:
   A) passing the first liquid through a first inlet and a second liquid through a second inlet of a vessel, wherein the vessel further comprises:
      1) a plurality of vortex contactors, wherein the plurality of vortex contactors comprises at least a first and a second vortex contactor, each vortex contactor in turn comprising:
         a) at least one wall forming a perimeter about an interior space and comprising a first side and a second side forming a passageway communicating the first liquid from an exterior to the interior space; and
         b) a frustum positioned proximate to the passageway and abutting the at least one wall for facilitating contacting of the first and second liquids to extract the one or more sulfur compounds from the first liquid to the second liquid; and
      2) a first outlet and a second outlet;
   B) passing the first and second liquids through the passageways of the plurality of vortex contactors;
   C) passing the first and second liquids from the plurality of vortex contactors through a coalescer thereby forming a contaminate-depleted liquid and a contaminate-enriched liquid; and
   D) passing the contaminate-depleted liquid through the first outlet and the contaminate-enriched liquid through the second outlet.

2. The process according to claim 1, wherein the frustum comprises a funnical frustum to facilitate formation of a vortex in the passageways.

3. The process according to claim 1, wherein the vessel is substantially cylindrical and orientated horizontally.

4. The process according to claim 3, wherein the vessel further comprises a first end and a second end, a top, and a bottom, wherein the first and second inlets are formed at the first end and the first outlet is at the top and the second outlet is at the bottom of the vessel.

5. The process according to claim 4, further comprising passing the first liquid to a third inlet and passing the second liquid to a fourth inlet at the second end of the vessel wherein the first and second outlets are proximate to a middle of the vessel.

6. The process according to claim 1, wherein the coalescer further comprises at least one of a metal mesh, a hydrophobic mesh, a hydrophilic mesh, one or more metal wires, steel wool, one or more vanes, one or more glass fibers, sand, and a coalescing media including one or particulates.

7. The process according to claim 1, wherein the first liquid is a hydrocarbon liquid and the second liquid is an alkaline liquid and wherein the first and second liquids downstream of the coalescer form a first phase and a second phase, wherein the first phase substantially comprises the contaminant-depleted hydrocarbon liquid and the second phase substantially comprises the contaminate-enriched alkaline liquid.

8. The process according to claim 7, wherein the first liquid is a hydrocarbon liquid and the second liquid is an alkaline liquid and wherein the contaminant-depleted liquid comprises no more than about 10 ppm, by weight, of the alkaline liquid.

9. The process according to claim 1, further comprising communicating the second liquid to an inlet manifold for providing the second liquid to respective vortex contactors.

10. The process according to claim 9, further comprising communicating the contacted second liquid to an outlet collector manifold from the respective vortex contactors wherein the outlet collector manifold is coupled to a pipe for providing the contacted second liquid proximate to a bottom of the vessel.

* * * * *